United States Patent
Naganuma et al.

[19]

[11] Patent Number: 5,905,827
[45] Date of Patent: May 18, 1999

[54] OPTICAL MULTIPLEXER/DEMULTIPLEXER AND WAVELENGTH DIVISION MULTIPLEXING MODULE

[75] Inventors: Norihisa Naganuma; Teruhiro Kubo, both of Sapporo; Nobuhiro Fukushima, Kawasaki, all of Japan

[73] Assignee: Fujitsu Limited, Kawasaki, Japan

[21] Appl. No.: 08/801,808

[22] Filed: Feb. 14, 1997

[30] Foreign Application Priority Data

Sep. 3, 1996 [JP] Japan .................................. 8-233472

[51] Int. Cl.⁶ ..................................................... G02B 6/32
[52] U.S. Cl. ................................ 385/31; 385/72; 385/73
[58] Field of Search ................................. 385/31, 33–35, 385/51, 52, 72, 73, 90, 91, 92, 88, 93, 94

[56] References Cited

U.S. PATENT DOCUMENTS

| | | | |
|---|---|---|---|
| 4,244,045 | 1/1981 | Nosu et al. ................................. | 370/3 |
| 5,416,867 | 5/1995 | Thosten et al. ............................ | 385/73 |
| 5,583,683 | 12/1996 | Scobey ..................................... | 359/127 |
| 5,621,573 | 4/1997 | Lewis et al. .............................. | 359/634 |
| 5,703,992 | 12/1997 | Bergmann ................................. | 385/139 |
| 5,796,887 | 8/1998 | Naganuma et al. ....................... | 385/18 |
| 5,801,892 | 9/1998 | Naganuma et al. ....................... | 359/892 |

*Primary Examiner*—John D. Lee
*Assistant Examiner*—Ellen E. Kang
*Attorney, Agent, or Firm*—Staas & Halsey

[57] ABSTRACT

A wavelength division multiplexing module capable of multiplexing or demultiplexing a plurality of optical signals having close wavelengths with less crosstalk. The wavelength division multiplexing module includes a housing having a bottom wall, a first side wall, and a second side wall inclined a predetermined angle with respect to the first side wall, and a common port assembly fixed to the bottom wall of the housing so as to emit a collimated beam substantially perpendicular to the first side wall. One or more filter port assemblies are fixed to the first side wall in the condition that the pass wavelength characteristic and optical axis of each assembly have been adjusted. Similarly, one or more filter port assemblies are fixed to the second side wall in the condition that the pass wavelength characteristic and optical axis of each assembly have been adjusted. Each filter port assembly includes an optical film holder rotatable in a hole having a center axis inclined a predetermined angle $\theta 1$ with respect to the optical axis, and a band-pass filter mounted in the optical film holder so as to be inclined a predetermined angle $\theta 2$ with respect to a plane normal to the center axis of the hole of the optical film holder.

11 Claims, 9 Drawing Sheets

OPTICAL MULTIPLEXER/DEMULTIPLEXER AND WAVELENGTH DIVISION MULTIPLEXING MODULE

BACKGROUND OF THE INVENTION

1. Field of the Invention

The present invention relates to an optical multiplexer/demultiplexer and a wavelength division multiplexing module.

2. Description of the Related Art

In recent years, an optical communication system using a silica fiber as an optical transmission line has been put into practical use, and it is required to reduce the size and cost for optical devices applied to this kind of optical communication system. Further, a wavelength division multiplexing (WDM) transmission system for transmitting a plurality of optical signals having different wavelengths through a single optical fiber has recently come to attention as a system capable of obtaining a greatly large transmission capacity and cost performance. In the wavelength division multiplexing transmission system, a band-pass filter having high-precision characteristics is required, so as to combine or separate a plurality of optical signals of close wavelength channels.

It is known that a band-pass filter, low-pass filter, high-pass filter, and other functions can be obtained by inserting in an optical medium propagating an optical beam an optical film composed of a single or plural layers having refractive indices different from the refractive index of the optical medium. For example, a band-pass filter used in an optical communication system is formed from an optical film obtained by alternately laminating low-refractive index layers and high-refractive index layers each having a predetermined thickness. The low-refractive index layers and the high-refractive index layers are formed of $SiO_2$ and $TiO_2$, respectively.

In fabricating the optical film, high-precision characteristics can be obtained by precisely controlling the thickness of the optical film as a whole or the thickness of each layer constituting the optical film. However, in a band-pass filter, for example, it is difficult to control a center wavelength in a pass band on the order of 1 nm by its fabrication technique only. To cope with this, not only the thickness of the optical film or each layer is controlled in its fabrication, but also an incident angle to the optical film fabricated is conventionally adjusted to change an equivalent thickness of the optical film or each layer, thereby finely adjusting the characteristics of the optical film.

In configuring an optical multiplexer/demultiplexer for optical signals having close wavelengths spaced about 1 nm from each other by using such an optical film, the characteristics of the band-pass filter formed from the optical film must be finely adjusted by adjusting the incident angle to the band-pass filter. However, a conventional mechanism for changing the incident angle to the optical film is apt to become large and complicated. Accordingly, an optical multiplexer/demultiplexer having such a mechanism becomes large in size and requires a high cost.

SUMMARY OF THE INVENTION

It is therefore an object of the present invention to provide an optical multiplexer/demultiplexer having a mechanism for finely adjusting a center wavelength in a pass band with a small size and a low cost.

It is another object of the present invention to provide a wavelength division multiplexing module which can multiplex or demultiplex a plurality of optical signals having close wavelengths with less crosstalk.

In accordance with an aspect of the present invention, there is provided an optical multiplexer/demultiplexer comprising a lens holder including a first hole having a first center axis and a second hole having a second center axis inclined a first predetermined angle with respect to said first center axis of said first hole; a lens inserted and fixed in said first hole; a fiber assembly including a ferrule and a fiber inserted and fixed in said ferrule, said ferrule being inserted and fixed in said first hole; a first optical film holder inserted in said second hole, and having a first through hole having a center axis coincident with said second center axis; and a first band-pass filter fixed in said first through hole of said first optical film holder so as to be inclined a second predetermined angle with respect to a plane normal to said center axis of said first through hole, said first band-pass filter being formed of an optical film.

Preferably, the optical multiplexer/demultiplexer further comprises a second optical film holder inserted in said second hole, and having a second through hole having a center axis coincident with said second center axis; and a second band-pass filter fixed in said second through hole of said second optical film holder so as to be inclined said second predetermined angle with respect to a plane normal to said center axis of said second through hole, said second band-pass filter being formed from an optical film.

For example, a center wavelength in a pass band of the first band-pass filter is substantially coincident with a center wavelength in a pass band of the second band-pass filter. By superimposing the two band-pass filters having the same characteristic, a band-pass filter having a narrow pass band can be obtained to allow suppression of crosstalk in the optical multiplexer/demultiplexer.

In accordance with another aspect of the present invention, there is provided a wavelength division multiplexing module comprising a housing having a bottom wall, a first side wall, and a second side wall opposed to said first side wall so as to be inclined a first predetermined angle with respect to said first side wall; a common port assembly fixed to said bottom wall so as to emit a collimated beam substantially perpendicular to said first side wall; a first filter port assembly fixed to said first side wall so that said collimated beam emitted from said common port assembly is coupled to said first filter port assembly, said first filter port assembly being capable of passing light having a wavelength $\lambda 1$ and reflecting light having other wavelengths; a second filter port assembly fixed to said second side wall so that the light reflected by said first filter port assembly is coupled to said second filter port assembly, said second filter port assembly being capable of passing light having a wavelength $\lambda 2$ and reflecting light having other wavelengths; and an input/output port assembly fixed to said first side wall so that the light reflected by said second filter port assembly is coupled to said input/output port assembly; said first filter port assembly comprising a first lens holder including a first hole having a first center axis and a second hole having a second center axis inclined a second predetermined angle with respect to said first center axis of said first hole; a first lens inserted and fixed in said first hole; a first fiber assembly including a first ferrule and a first fiber inserted and fixed in said first ferrule, said first ferrule being inserted and fixed in said first hole; a first optical film holder inserted in said second hole, and having a first through hole having a center axis coincident with said second center axis; and a first band-pass filter fixed in said first through hole of said first optical film holder so as to be inclined a third predetermined angle with respect to a plane normal to said center axis of said first through hole, said first band-pass filter being formed from an optical film and passing the light having the wavelength λ1.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
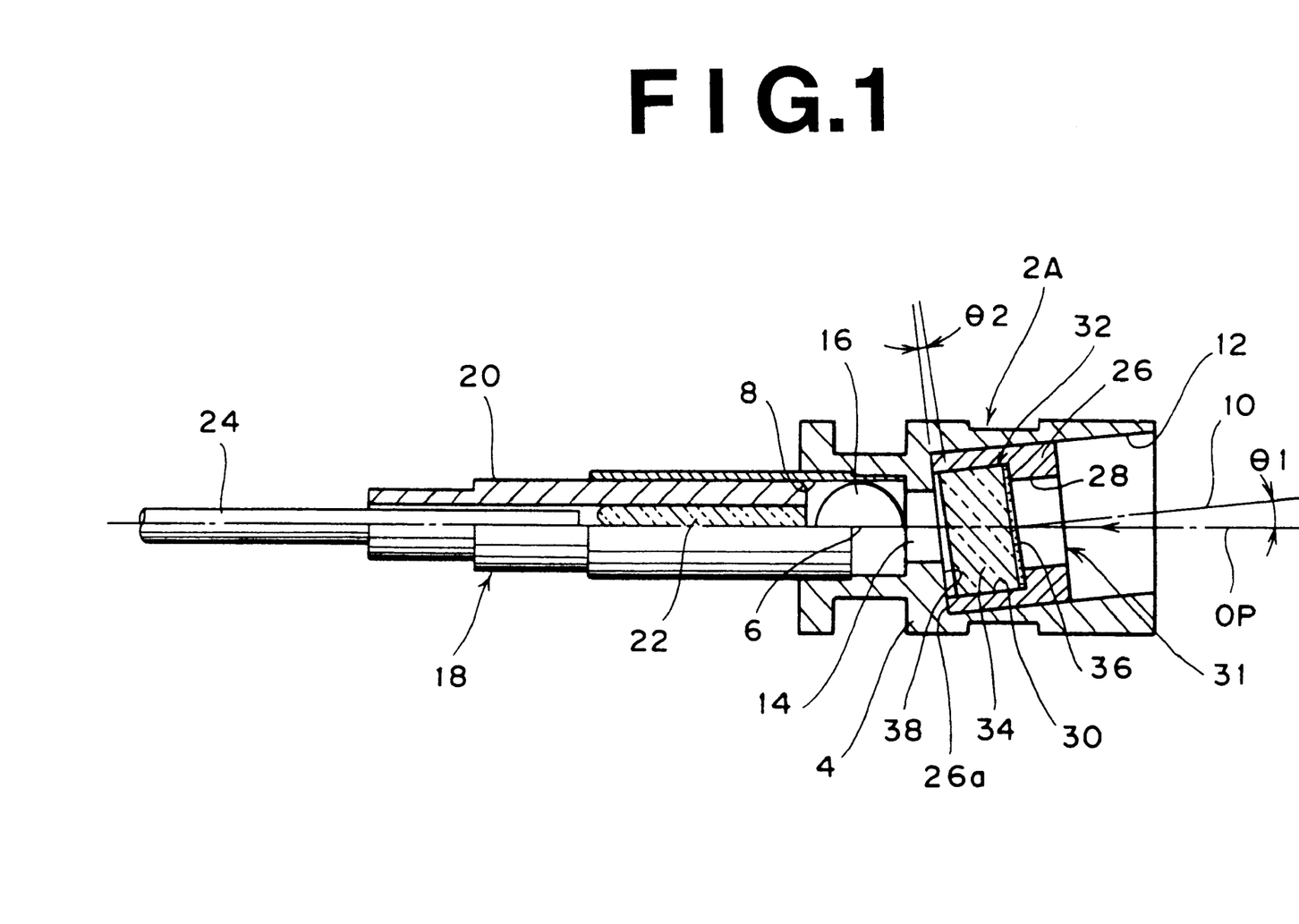
FIG. 1 is a longitudinal sectional view of an optical multiplexer/demultiplexer according to a first preferred embodiment of the present invention.

Some preferred embodiments of the present invention will now be described in detail with reference to the drawings. Referring to FIG. 1, there is shown a longitudinal sectional view of an optical multiplexer/demultiplexer 2A according to a first preferred embodiment of the present invention. A lens holder 4 includes a first hole 8 having a first center axis 6 and a second hole 12 having a second center axis 10 inclined a first predetermined angle θ1 with respect to the first center axis 6 of the first hole 8. In this preferred embodiment, the angle θ1 is set to about 7.5 degrees.

The first hole 8 and the second hole 12 are in communication with each other through a hole 14. A lens 16 is press-fitted in the first hole 8. Reference numeral 18 denotes a fiber assembly, which includes a ferrule 20, a ceramic capillary 22 inserted and fixed in the ferrule 20, and an optical fiber 24 whose bare fiber obtained by removing a coating is inserted and fixed in the center hole of the ceramic capillary 22. The ferrule 20 is inserted into the first hole 8 up to a position such that light emitted from an excitation end of the optical fiber 24 is converted into a substantially collimated beam by the lens 16, and is fixed to the lens holder 4 by laser welding, for example. The center axis of the ferrule 20 and the center axis 6 of the first hole 8 are coincidence with each other. The lens holder 4 and the ferrule 20 are formed of stainless steel.

Reference numeral 26 denotes an optical film holder formed of stainless steel. The optical film holder 26 has a stepped through hole 31 consisting of a small-diameter hole 28 and a large-diameter hole 30. The center axis of the stepped through hole 31 of the optical film holder 26 is in coincidence with the second center axis 10 of the second hole 12 of the lens holder 4. A band-pass filter 32 is inserted in the large-diameter hole 30 of the optical film holder 26, and is fixed by an adhesive, for example. The band-pass filter 32 includes a transparent plate 34 formed of glass or the like and an optical film 36 formed on one end surface of the transparent plate 30.

The band-pass filter 32 is fixed in the large-diameter hole 30 so as to be inclined a predetermined angle θ2 with respect to a plane normal to the center axis 10 of the stepped through hole 31. In this preferred embodiment, the angle θ2 is set to about 2 degrees. Accordingly, the optical film 36 is also inclined the same angle θ2 with respect to the plane normal to the center axis 10 of the stepped through hole 31. The optical film 36 may be a dielectric multilayer film formed by alternately laminating low-refractive index layers of $SiO_2$ and high-refractive index layers of $TiO_2$, for example.

The optical film holder 26 is inserted into the second hole 12 until an end surface 26a of the optical film holder 26 comes to abutment against a bottom surface 38 of the second hole 12 of the lens holder 4. Reference symbol OP denotes an optical path in the case that the optical multiplexer/demultiplexer 2A is used as a demultiplexer. The optical path OP is in coincidence with the center axis 6 of the first hole 8, therefore the center axis of the ferrule 20. In the case that the optical multiplexer/demultiplexer 2A is used as a multiplexer, light is emitted from the excitation end of the optical fiber 24 in a direction opposite to the direction shown by an arrow of the optical path OP, then converted into a collimated beam by the lens 16, and thereafter the collimated beam is passed through the band-pass filter 32.

On the basis of the above configuration that the center axis 10 of the optical film holder 26 as the center of rotation of the optical film 36 is inclined the predetermined angle θ1 with respect to the optical path OP and that the optical film 36 is inclined the predetermined angle θ2 with respect to the plane normal to the center axis 10, an incident angle in the optical film 36 can be changed by rotating the optical film holder 26 in the second hole 12 of the lens holder 4. The incident angle is defined as an angle formed by a ray of incident light on an interface between two media having different refractive indices and a normal to the interface at a point of incidence.

Figure 2A:
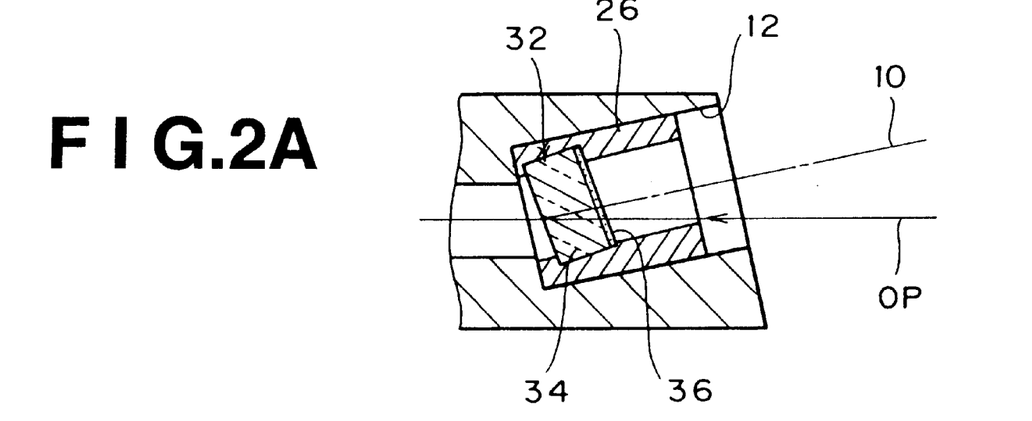
FIGS. 2A and 2B are sectional views for illustrating that an incident angle to an optical film is variable.
Figure 2B:
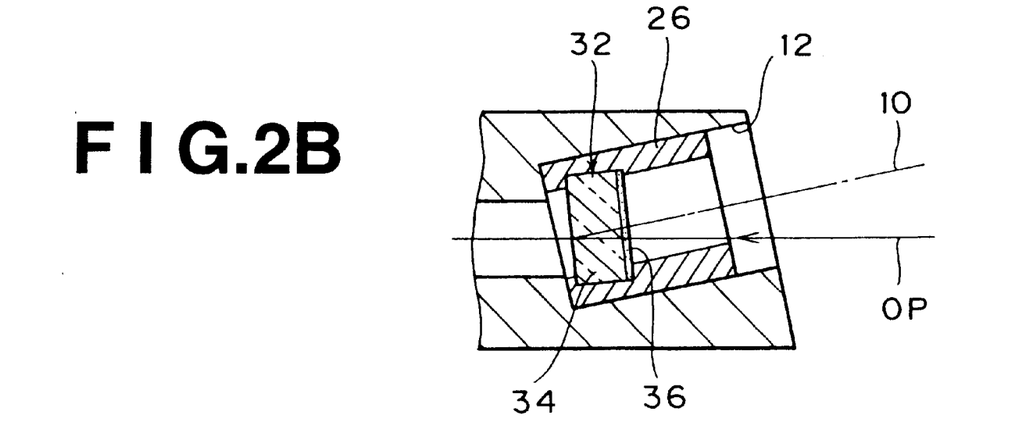

There will now be considered the principle of variation and the range of variation of the incident angle in the optical film 36 with reference to FIGS. 2A and 2B. The position of the optical film holder 26 shown in FIG. 2B corresponds to a position obtained by rotating 180 the optical film holder 26 shown in FIG. 2A. In the case that the optical path OP of incident light is in coincidence with the center axis of the ferrule 20, the position shown in FIG. 2A provides a maximum incident angle, which is equal to θ1+θ2, and the position shown in FIG. 2B provides a minimum incident angle, which is equal to θ1−θ2.

With rotation of the optical film holder 26 between the position shown in FIG. 2A and the position shown in FIG. 2B, a plane containing both the optical path OP and the center axis 10 of the optical film holder 26 is gradually inclined with respect to a plane normal to the optical film 36, and accordingly the incident angle is continuously changed between the maximum incident angle and the minimum incident angle. In this manner, the incident angle can be set to an arbitrary value between the maximum incident angle and the minimum incident angle by adjusting a rotational position of the optical film holder 26. When θ1=7.5° and θ2=2°, for example, the incident angle can be adjusted in a range between 5.5° and 9.5°.

The adjustment of the optical film holder 26 is made by rotating the optical film holder 26 in the second hole 12 and next fixing the optical film holder 26 when a desired characteristic of the band-pass filter 32 is obtained. This adjusting method is carried out in the following manner. First, light is emitted from the excitation end of the optical fiber 24 and converted into a collimated beam by the lens 16. The collimated beam is passed through the band-pass filter 32. The light passed through the band-pass filter 32 is received by a lens assembly not shown, and monitored by an optical spectrum analyzer. The optical film holder 26 is rotated in the second hole 12 and adjusted so that the light passed through the band-pass filter 32 has a desired wavelength characteristic. At a rotational position of the optical film holder 26 when the desired wavelength characteristic has been obtained, the optical film holder 26 is fixed to the lens holder 4 by spot welding using a laser beam.

Figure 3:
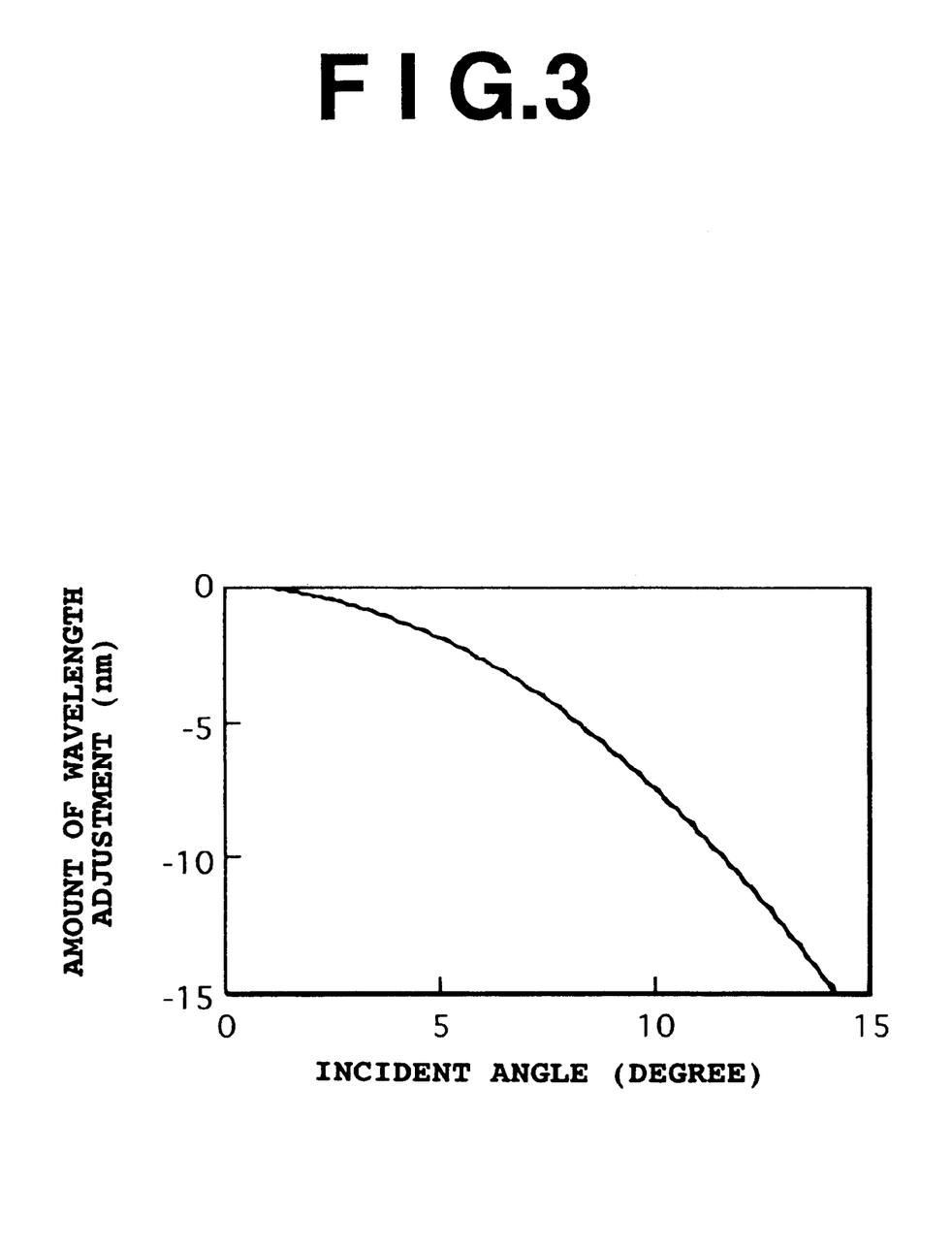
FIG. 3 is a graph showing the relation between an incident angle to an optical film and an amount of wavelength adjustment.

A change in characteristic of the optical film with a change in incident angle will be described with reference to FIG. 3. FIG. 3 is a graph showing the relation between an amount of change in center wavelength in a pass band, i.e., an amount of wavelength adjustment and an incident angle in the case where the optical film 36 functions as a band-pass filter. As apparent from FIG. 3, the amount of wavelength adjustment continuously increases with an increase in the incident angle. Thus in the optical multiplexer/demultiplexer 2A according to this preferred embodiment, a desired characteristic of the band-pass filter 32 can be obtained by changing the incident angle. Further, a mechanism for rotating the optical film holder 26 in the first preferred embodiment shown in FIG. 1 is greatly simple. Accordingly, the optical multiplexer/demultiplexer 2A can be reduced in size and cost.

Figure 4:
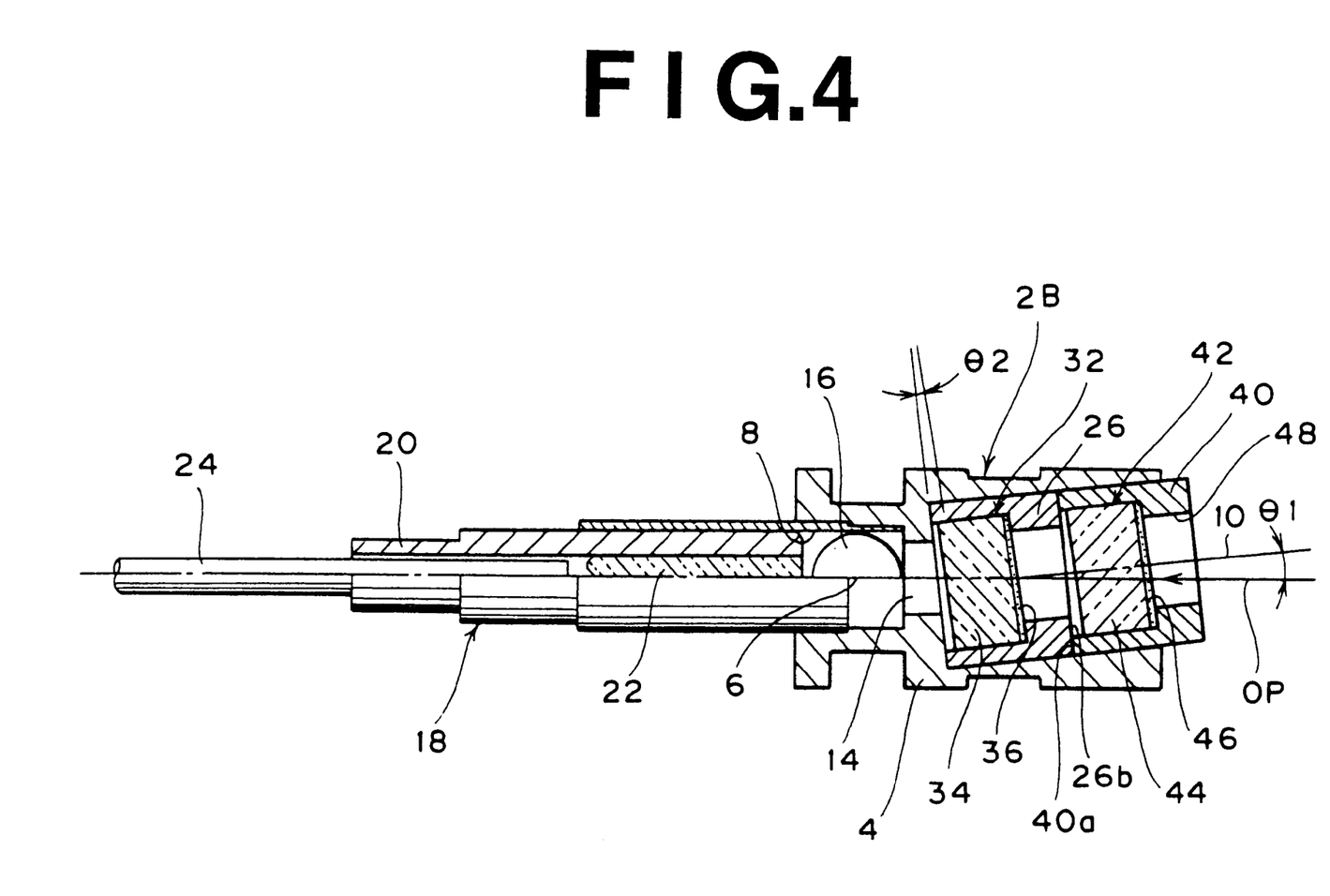
FIG. 4 is a longitudinal sectional view of an optical multiplexer/demultiplexer according to a second preferred embodiment of the present invention.

Referring to FIG. 4, there is shown a longitudinal sectional view of an optical multiplexer/demultiplexer 2B according to a second preferred embodiment of the present invention. In the description of this preferred embodiment, substantially the same parts as those in the first preferred embodiment shown in FIG. 1 will be denoted by the same reference numerals, and the description thereof will be omitted to avoid repetition. The optical multiplexer/demultiplexer 2B according to this preferred embodiment is characterized in that a second band-pass filter 42 is additionally inserted in the second hole 12 of the lens holder 4. Like the band-pass filter 32, the band-pass filter 42 is configured by forming an optical film 46 on one end surface of a transparent plate 44.

Like the optical film 36, the optical film 46 may be a dielectric multilayer film formed by alternately laminating low-refractive index layers of $SiO_2$ and high-refractive index layers of $TiO_2$. The band-pass filter 42 is inserted in a stepped through hole 48 of an optical film holder 40, and fixed so as to be inclined the predetermined angle θ2 with respect to the plane normal to the center axis 10 of the optical film holder 40. The optical film holder 40 having the second band-pass filter 42 is inserted into the second hole 12 of the lens holder 4, and is next rotated in the second hole 12 so that the band-pass filter 42 has a desired wavelength characteristic, thus adjusting the optical film holder 40. After adjustment, the optical film holder 40 is spot-welded to the lens holder 4 by using a laser beam.

Figure 5A:
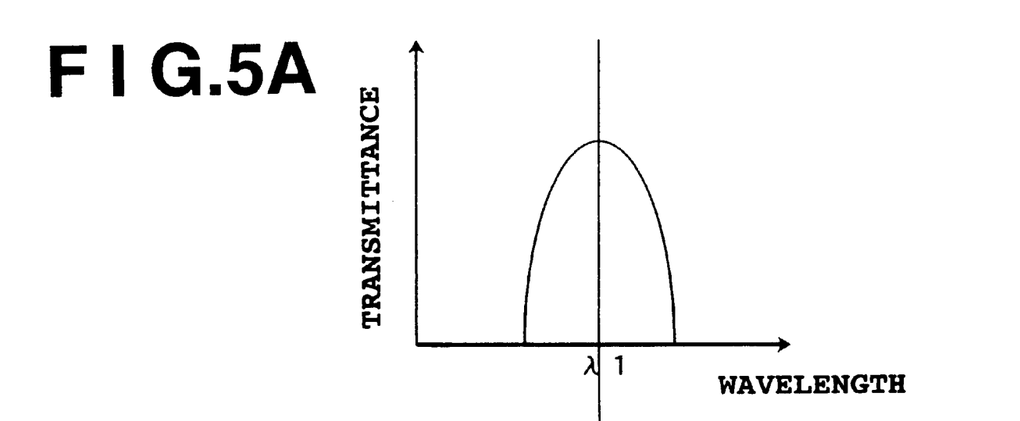
FIGS. 5A to 5C are graphs for illustrating an example that two band-pass filters having the same pass wavelength characteristic are used.
Figure 5B:
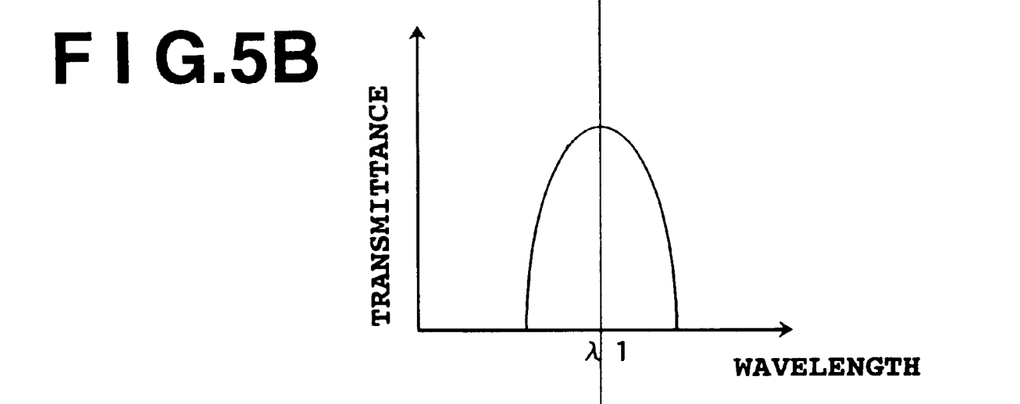
Figure 5C:
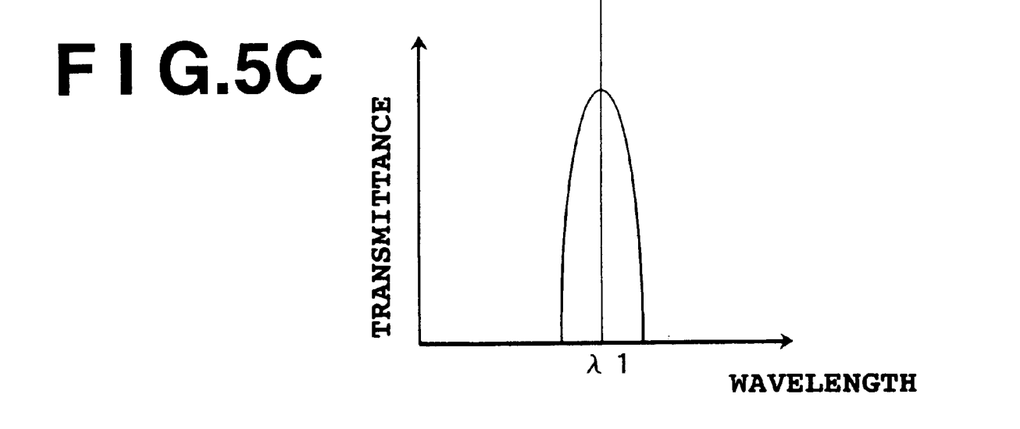

The first band-pass filter 32 and the second band-pass filter 42 have the same pass wavelength characteristic, for example. That is, a center wavelength λ1 in a pass band of the band-pass filter 32 as shown in FIG. 5A is coincident with a center wavelength λ1 in a pass band of the band-pass filter 42 as shown in FIG. 5B. By using the two band-pass filters 32 and 42 having the same pass wavelength characteristic in this manner, the same function as that of a band-pass filter having a narrow pass band as shown in FIG. 5C can be obtained. Accordingly, light having a plurality of wavelengths with narrow wavelength spacings of about 1 nm can be multiplexed or demultiplexed with less crosstalk.

Figure 6A:
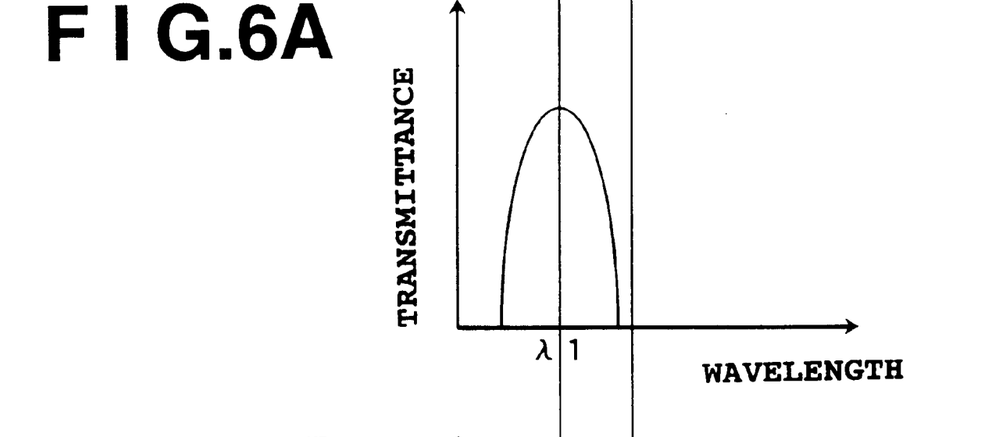
FIGS. 6A to 6C are graphs for illustrating another example that two band-pass filters having different pass wavelength characteristics are used.
Figure 6B:
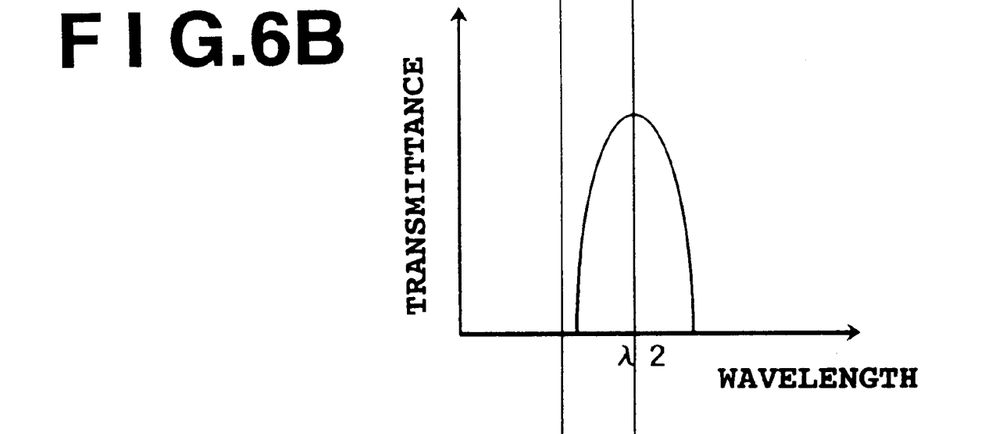
Figure 6C:
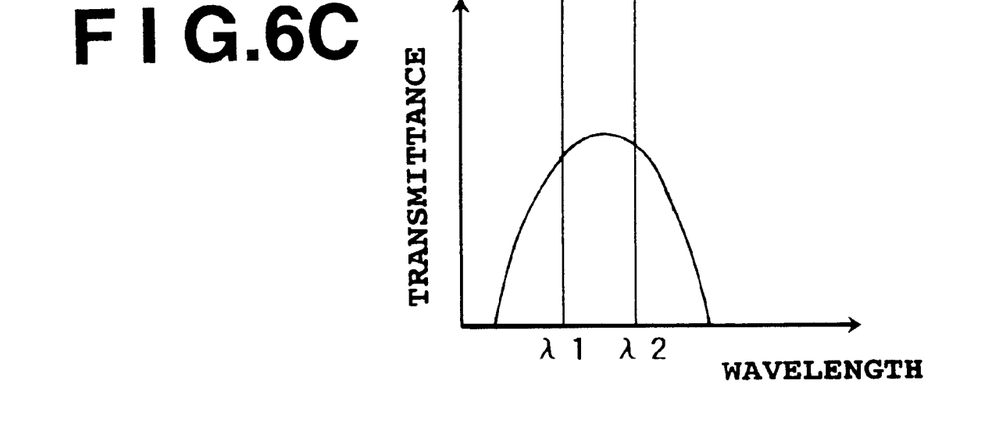

Alternatively, the pass wavelength characteristic of the band-pass filter 32 and the pass wavelength characteristic of the band-pass filter 42 may be made different from each other. That is, the center wavelength in the pass band of the band-pass filter 32 is set to θ1 as shown in FIG. 6A, and the center wavelength in the pass band of the band-pass filter 42 is set to λ2 close to λ1 as shown in FIG. 6B. Accordingly, the same function as that of a band-pass filter having a wide pass band as shown in FIG. 6C can be obtained.

Figure 7:
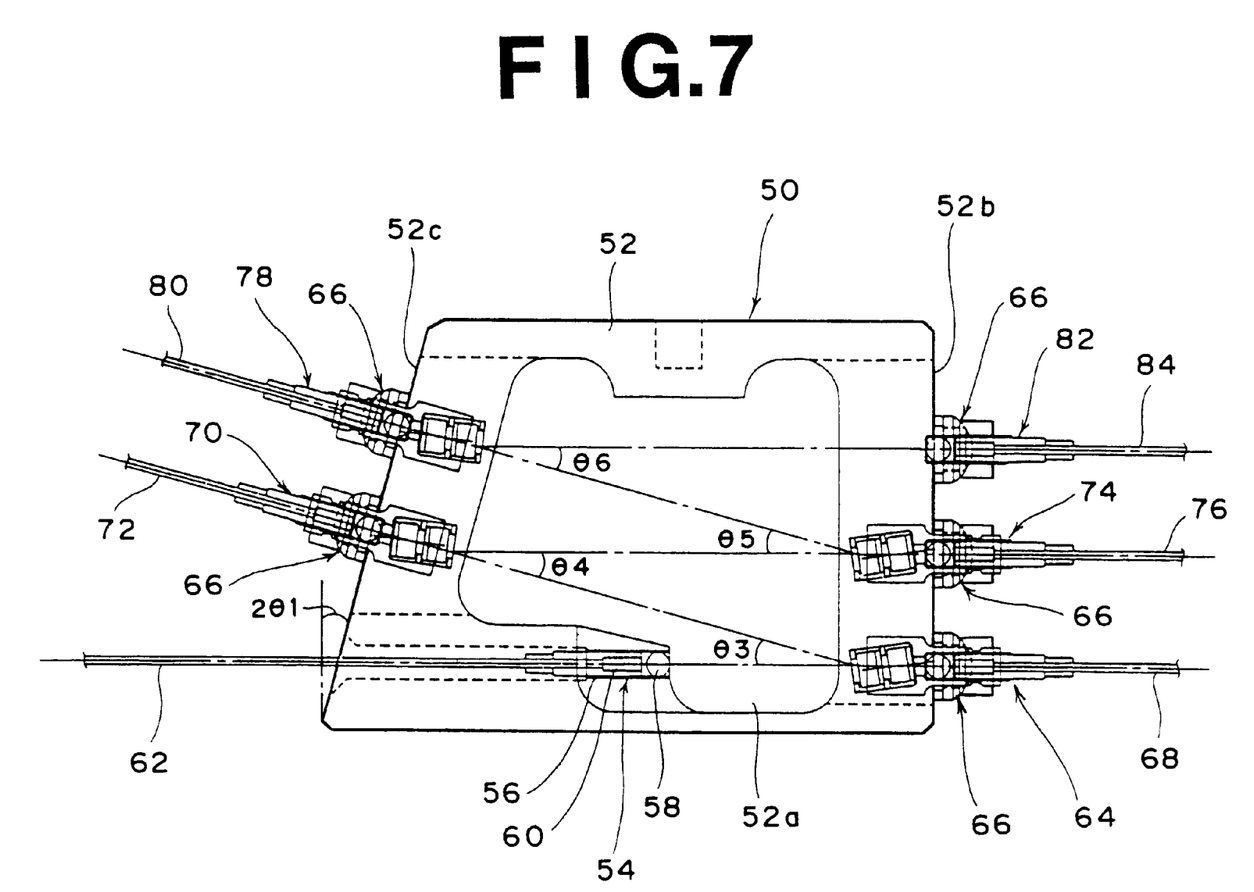
FIG. 7 is a plan view of a wavelength division multiplexing module according to the present invention.
Figure 8:
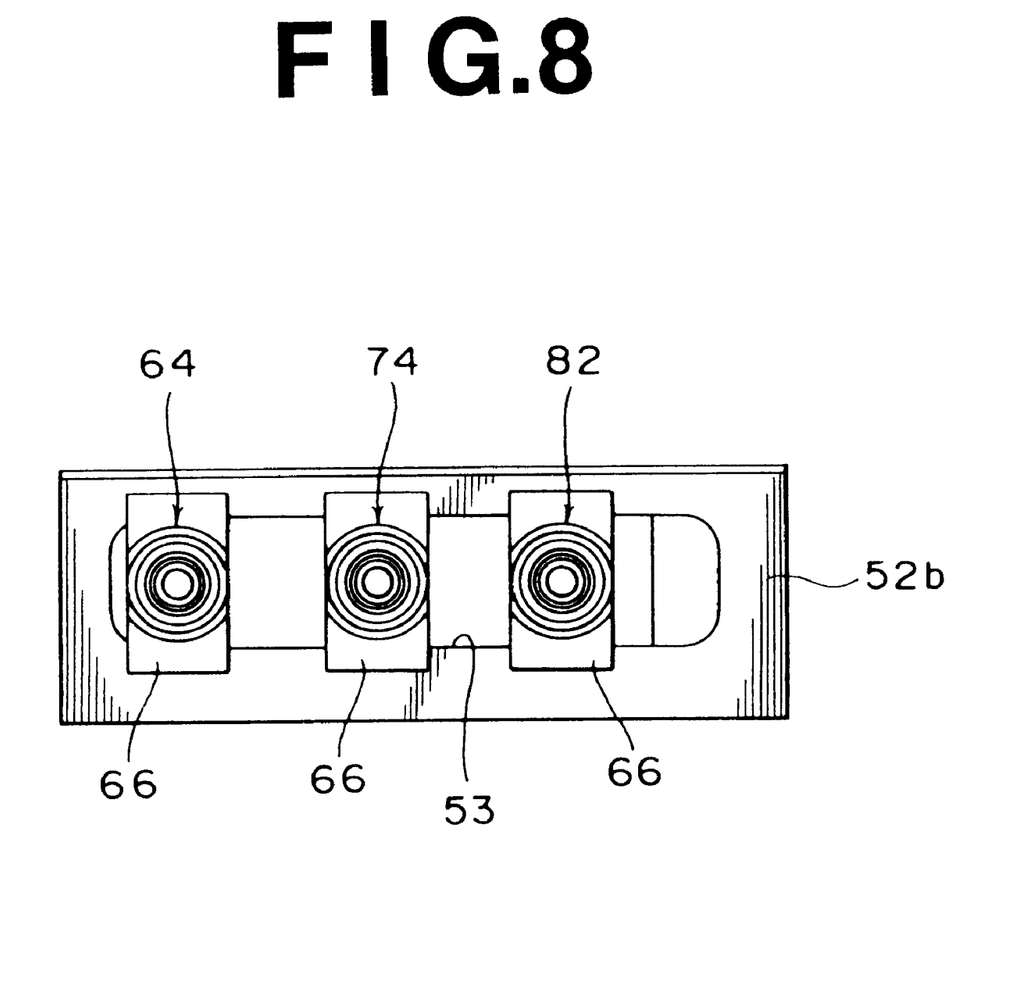
FIG. 8 is a right side view of FIG. 7.

Referring to FIG. 7, there is shown a plan view of a wavelength division multiplexing module 50 using the optical multiplexer/demultiplexer of the present invention. FIG. 8 is a right side view of FIG. 7. A housing 52 of the wavelength division multiplexing module 50 has a bottom wall 52a, a first side wall 52b, and a second side wall 52c inclined a predetermined angle (2θ1 in this preferred embodiment) with respect to the first side wall 52b. A common port assembly 54 is mounted in the bottom wall 52a. The common port assembly 54 includes a lens holder 56, a lens 58 press-fitted in the lens holder 56, a ferrule 60 inserted and fixed in the lens holder 56, and an optical fiber 62 inserted and fixed in the ferrule 60. The common port assembly 54 is fixed to the bottom wall 52a so that a light beam emitted from the common port assembly 54 is perpendicular to the first side wall 52b.

A first filter port assembly 64 and a third filter port assembly 74 each similar to the optical multiplexer/demultiplexer 2B according to the second preferred embodiment shown in FIG. 4 are mounted on the first side wall 52b through fixing structures 66. The first filter port assembly 64 has band-pass filters 32 and 42 passing light having a wavelength λ1, and is connected to an optical fiber 68. The third filter port assembly 74 has band-pass filters 32 and 42 passing light having a wavelength λ3, and is connected to an optical fiber 76. An input/output port assembly 82 is further mounted on the first side wall 52b through a fixing structure 66. The input/output port assembly 82 is connected to an optical fiber 84.

On the other hand, a second filter port assembly 70 and a fourth filter port assembly 78 are mounted on the second side wall 52c through fixing structures 66. The second filter port assembly 70 has band-pass filters 32 and 42 passing light having a wavelength λ2, and is connected to an optical fiber 72. The fourth filter port assembly 78 has band-pass filters 32 and 42 passing light having a wavelength λ4, and is connected to an optical fiber 80.

The pass wavelength characteristic of each of the first to fourth filter port assemblies 64, 70, 74, and 78 is preliminarily adjusted to be a desired pass wavelength characteristic by the above-mentioned adjusting method. Accordingly, the wavelength division multiplexing module 50 can be simply assembled by only performing optical axis adjustment without the adjustment of the wavelength characteristic. As shown in FIG. 8, a recess 53 is formed in the first side wall 52b. The first and third filter port assemblies 64 and 74 and the input/output port assembly 82 are inserted into the recess 53, and are next mounted on the first side wall 52b by the respective fixing structures 66.

A fixing method for the second filter port assembly 70 to the housing 52 will be described with reference to FIG. 9. The other filter port assemblies 64, 74, and 78 and the input/output port assembly 82 are also fixed to the housing 52 by a similar method. The fixing structure 66 is composed of a block 88, a spherical projection 90 fixed to the block 88, and a member 92 having a spherical recess corresponding to the shape of the spherical projection 90. The member 92 is fixed to the lens holder 4. The block 88 and the spherical projection 90 have through holes 89 and 91, respectively.

Figure 9:
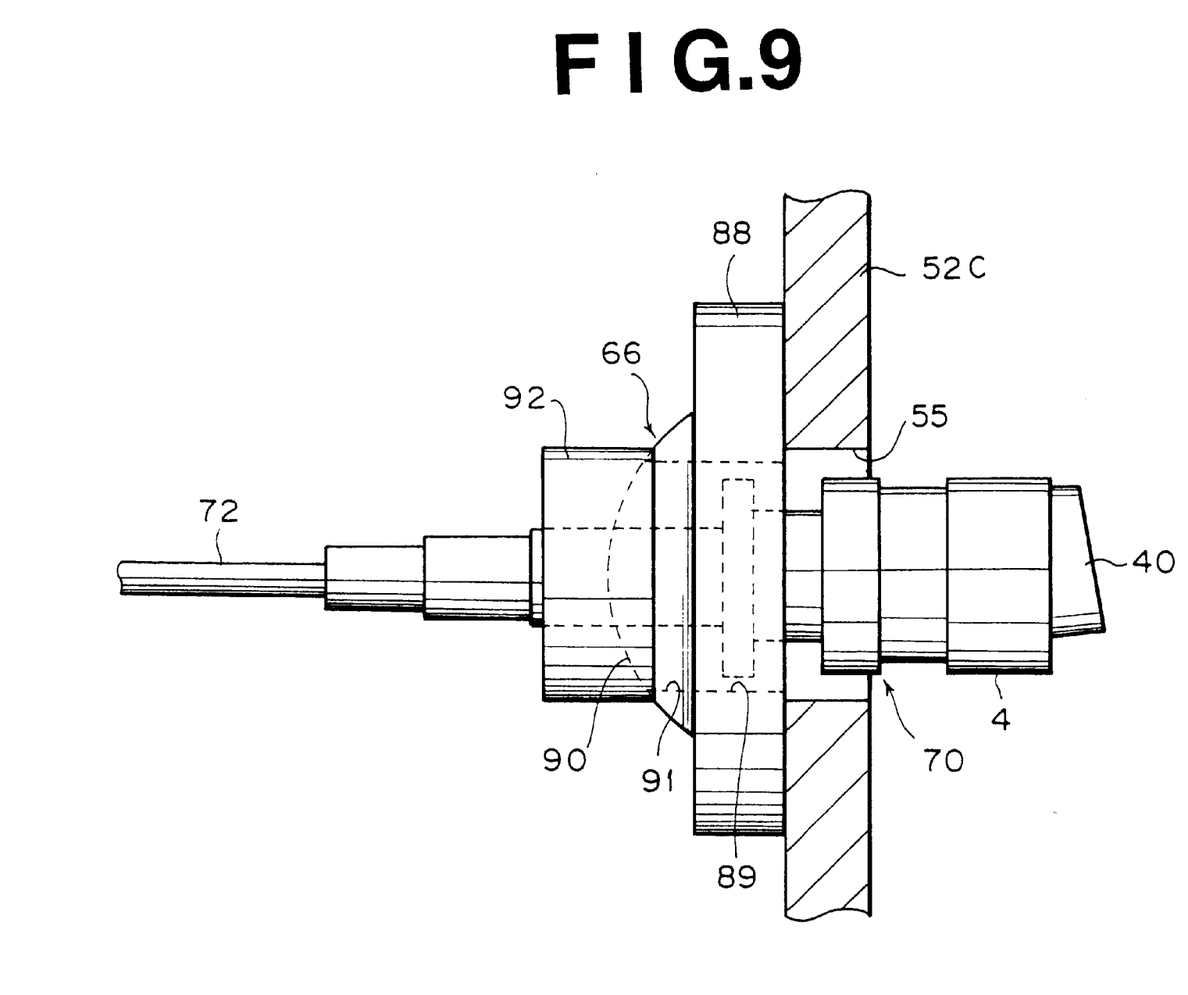
FIG. 9 is a view illustrating a fixing method for a filter port assembly (optical multiplexer/demultiplexer) to a housing.

The second filter port assembly 70 is inserted through the through hole 91 of the spherical projection 90, the through hole 89 of the block 88, and an opening 55 formed through the second side wall 52c of the housing 52 as shown in FIG. 9. The block 88 is moved along a wall surface of the second side wall 52c in an X direction (lateral direction) and a Y direction (longitudinal direction), and the member 92 is spherically slid on the spherical projection 90 to thereby carry out optical axis adjustment of the second filter port assembly 70.

After the optical axis adjustment, the block 88 is spot-welded to the second side wall 52c of the housing 52, and the member 92 is spot-welded to the spherical projection 90. Thus, the second filter port assembly 70 is properly adjusted in optical axis and fixed to the housing 52. The first, third, and fourth filter port assemblies 64, 74, and 78 and the input/output port assembly 82 are also fixed to the housing 52 after optical axis adjustment like the second filter port assembly 70.

The optical axis adjustment is carried out preferably in the order of the first filter port assembly 64, the second filter port assembly 70, the third filter port assembly 74, the fourth filter port assembly 78, and the input/output port assembly 82. At this time, the optical axis adjustment is carried out while wavelength division multiplexed optical signals having wavelengths $\lambda 1$ to $\lambda 5$, for example, are being emitted from the optical fiber 62. The angles $\theta 3$ to $\theta 6$ shown in FIG. 7 becomes somewhat different from each other because of rotational adjustment of the band-pass filters in each of the filter port assemblies 64, 70, 74, and 78; however, these angles are approximately equal to $2\theta 1$.

Further, since the second side wall 52c of the housing 52 is inclined $2\theta 1$ with respect to the first side wall 52b as mentioned above, the second and fourth filter port assemblies 70 and 78 can be fixed to the second side wall 52c at substantially right angles thereto. The first and third filter port assemblies 64 and 74 and the input/output port assembly 82 are also fixed to the first side wall 52b at substantially right angles thereto. That is, the use of the housing 52 having the second side wall 52c inclined $2\theta 1$ with respect to the first side wall 52b can make it simple to assembly the wavelength division multiplexing module 50.

In performing the optical axis adjustment of the filter port assemblies 64, 70, 74, and 78, each lens holder 4 is rotated about the optical axis so that an optical path reflected by each filter port assembly becomes parallel to the bottom wall 52a of the housing 52. Accordingly, vertical slip of the optical axis can be suppressed.

It is now assumed that wavelength division multiplexed optical signals having wavelengths $\lambda 1$ to $\lambda 8$ are propagated in the optical fiber 62 and emitted from the common port assembly 54. The optical signal having the wavelength $\lambda 1$ is passed through the band-pass filters 32 and 42 in the first filter port assembly 64, thereby separating off the optical signal having the wavelength $\lambda 1$. The other optical signals having the wavelengths $\lambda 2$ to $\lambda 8$ are reflected by the first filter port assembly 64. The optical signal having the wavelength $\lambda 2$ is separated off by the second filter port assembly 70; the optical signal having the wavelength $\lambda 3$ is separated off by the third filter port assembly 74; and the optical signal having the wavelength $\lambda 4$ is separated off by the fourth filter port assembly 78. The remaining optical signals having the wavelengths $\lambda 5$ to $\lambda 8$ are coupled to the input/output port assembly 82.

The above description has been directed to the case that the wavelength division multiplexing module 50 is used as a demultiplexer module. Conversely in the case that the wavelength division multiplexing module 50 is used as a multiplexer module, each optical signal is propagated in a reverse direction to obtain multiplexed optical signals from the common port assembly 54. While the input/output port assembly 82 is mounted on the first side wall 52b in the wavelength division multiplexing module 50 mentioned above, the input/output port assembly 82 may be mounted on the inclined second side wall 52c.

According to the present invention as described above, it is possible to provide an optical multiplexer/demultiplexer having a simple mechanism for finely adjusting a center wavelength in a pass band. Further, it is possible to provide a wavelength division multiplexing module which can multiplex or demultiplex a plurality of optical signals having close wavelengths with less crosstalk. Further, optical axis adjustment in the wavelength division multiplexing module can be simplified, and assembly steps for the wavelength division multiplexing module can be reduced.

What is claimed is:

1. An optical multiplexer/demultiplexer comprising:
    a lens holder including a first hole having a first center axis and a second hole having a second center axis inclined a first predetermined nonzero angle with respect to said first center axis of said first hole;
    a lens inserted and fixed in said first hole;
    a fiber assembly including a ferrule and a fiber inserted and fixed in said ferrule, said ferrule being inserted and fixed in said first hole;
    a first optical film holder inserted in said second hole, and having a first through hole having a center axis coincident with said second center axis; and
    a first band-pass filter fixed in said first through hole of said first optical film holder so as to be inclined a second predetermined nonzero angle with respect to a plane normal to said center axis of said first through hole, said first band-pass filter being formed of an optical film.

2. An optical multiplexer/demultiplexer according to claim 1, further comprising:
    a second optical film holder inserted in said second hole, and having a second through hole having a center axis coincident with said second center axis; and
    a second band-pass filter fixed in said second through hole of said second optical film holder so as to be inclined said second predetermined angle with respect to a plane normal to said center axis of said second through hole, said second band-pass filter being formed from an optical film.

3. An optical multiplexer/demultiplexer according to claim 2, wherein a center wavelength in a pass band of said first band-pass filter is coincident with a center wavelength in a pass band of said second band-pass filter.

4. An optical multiplexer/demultiplexer according to claim 2, wherein a center wavelength in a pass band of said first band-pass filter is different from a center wavelength in a pass band of said second band-pass filter.

5. A wavelength division multiplexing module comprising:
   a housing having a bottom wall, a first side wall, and a second side wall opposed to said first side wall so as to be inclined a first predetermined angle with respect to said first side wall;
   a common port assembly fixed to said bottom wall so as to emit a collimated beam substantially perpendicular to said first side wall;
   a first filter port assembly fixed to said first side wall so that said collimated beam emitted from said common port assembly is coupled to said first filter port assembly, said first filter port assembly being capable of passing light having a wavelength λ1 and reflecting light having other wavelengths;
   a second filter port assembly fixed to said second side wall so that the light reflected by said first filter port assembly is coupled to said second filter port assembly, said second filter port assembly being capable of passing light having a wavelength λ2 and reflecting light having other wavelengths; and
   an input/output port assembly fixed to said first side wall so that the light reflected by said second filter port assembly is coupled to said input/output port assembly;
   said first filter port assembly comprising:
      a first lens holder including a first hole having a first center axis and a second hole having a second center axis inclined a second predetermined nonzero angle with respect to said first center axis of said first hole;
      a first lens inserted and fixed in said first hole;
      a first fiber assembly including a first ferrule and a first fiber inserted and fixed in said first ferrule, said first ferrule being inserted and fixed in said first hole;
      a first optical film holder inserted in said second hole, and having a first through hole having a center axis coincident with said second center axis; and
      a first band-pass filter fixed in said first through hole of said first optical film holder so as to be inclined a third predetermined nonzero angle with respect to a plane normal to said center axis of said first through hole, said first band-pass filter being formed from an optical film and passing the light having the wavelength λ1.

6. A wavelength division multiplexing module according to claim 5, wherein said first filter port assembly further comprises:
   a second optical film holder inserted in said second hole, and having a second through hole having a center axis coincident with said second center axis; and
   a second band-pass filter fixed in said second through hole of said second optical film holder so as to be inclined said third predetermined angle with respect to a plane normal to said center axis of said second through hole, said second band-pass filter being formed from an optical film and passing the light having the wavelength λ1.

7. A wavelength division multiplexing module according to claim 5, wherein said first predetermined angle is substantially twice said second predetermined angle.

8. A wavelength division multiplexing module according to claim 5, wherein said second filter port assembly comprises:

a second lens holder including a third hole having a third center axis and a fourth hole having a fourth center axis inclined said second predetermined angle with respect to said third center axis of said third hole;
a second lens inserted and fixed in said third hole;
a second fiber assembly including a second ferrule and a second fiber inserted and fixed in said second ferrule, said second ferrule being inserted and fixed in said third hole;
a second optical film holder inserted in said fourth hole, and having a second through hole having a center axis coincident with said fourth center axis; and
a second band-pass filter fixed in said second through hole of said second optical film holder so as to be inclined said third predetermined angle with respect to a plane normal to said center axis of said second through hole, said second band-pass filter being formed from an optical film and passing the light having the wavelength λ2.

9. A wavelength division multiplexing module according to claim 8, wherein said second filter port assembly further comprises:
   a third optical film holder inserted in said fourth hole, and having a third through hole having a center axis coincident with said fourth center axis; and
   a third band-pass filter fixed in said third through hole of said third optical film holder so as to be inclined said third predetermined angle with respect to a plane normal to said center axis of said third through hole, said third band-pass filter being formed from an optical film and passing the light having the wavelength λ2.

10. A wavelength division multiplexing module comprising:
   a housing having a bottom wall, a first side wall, and a second side wall opposed to said first side wall so as to be inclined a first predetermined angle with respect to said first side wall;
   a common port assembly fixed to said bottom wall so as to emit a collimated beam substantially perpendicular to said first side wall;
   a filter port assembly fixed to said first side wall so that said collimated beam emitted from said common port assembly is coupled to said filter port assembly, said filter port assembly being capable of passing light having a wavelength λ1 and reflecting light having other wavelengths; and
   an input/output port assembly fixed to said second side wall so that the light reflected by said filter port assembly is coupled to said input/output port assembly;
   said filter port assembly comprising:
      a lens holder including a first hole having a first center axis and a second hole having a second center axis inclined a second predetermined nonzero angle with respect to said first center axis of said first hole;
      a lens inserted and fixed in said first hole;
      a fiber assembly including a ferrule and a fiber inserted and fixed in said ferrule, said ferrule being inserted and fixed in said first hole;

a first optical film holder inserted in said second hole, and having a first through hole having a center axis coincident with said second center axis; and a first band-pass filter fixed in said first through hole of said first optical film holder so as to be inclined a third predetermined nonzero angle with respect to a plane normal to said center axis of said first through hole, said first band-pass filter being formed from an optical film.

11. A wavelength division multiplexing module according to claim 10, wherein said filter port assembly further comprises:

a second optical film holder inserted in said second hole, and having a second through hole having a center axis coincident with said second center axis; and a second band-pass filter fixed in said second through hole of said second optical film holder so as to be inclined said third predetermined angle with respect to a plane normal to said center axis of said second through hole, said second band-pass filter being formed from an optical film.

* * * * *